Jan. 6, 1942. A. R. KNEIBLER Re. 21,999
UNDERGARMENT
Original Filed May 29, 1935 2 Sheets-Sheet 1
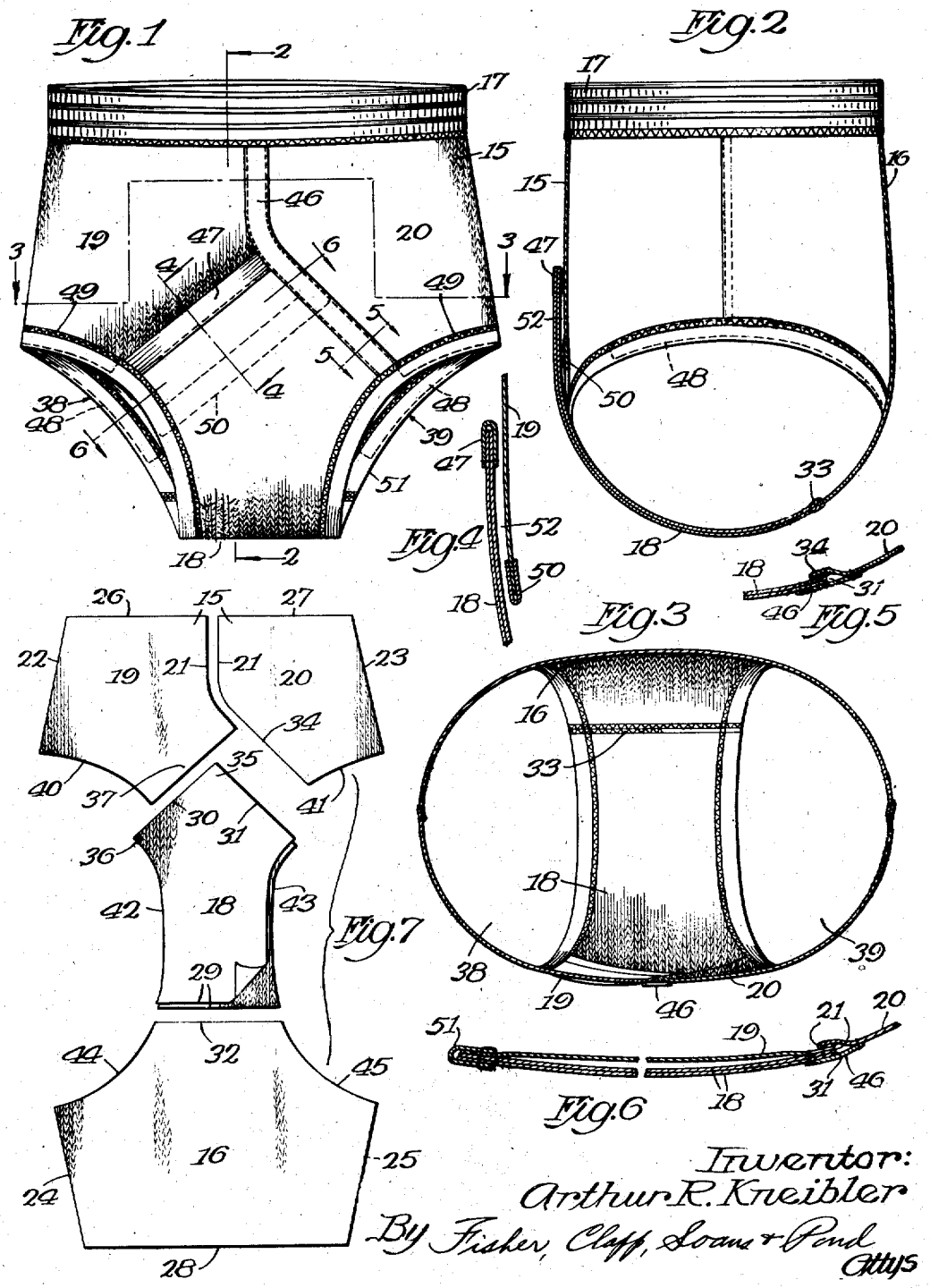
Inventor:
Arthur R. Kneibler
By Fisher, Cluff, Loane & Pond
Attys Jan. 6, 1942. A. R. KNEIBLER Re. 21,999

UNDERGARMENT

Original Filed May 29, 1935 2 Sheets-Sheet 2

Inventor:
Arthur R. Kneibler
By Fisher, Clapp, Sears & Pond
Attys.

Reissued Jan. 6, 1942

Re. 21,999

UNITED STATES PATENT OFFICE 21,999

UNDERGARMENT

Arthur R. Kneibler, Kenosha, Wis., assignor to Coopers Inc., Kenosha, Wis., a corporation of Wisconsin Original No. 2,019,140, dated October 29, 1935, Serial No. 23,995, May 29, 1935. Application for reissue October 17, 1940, Serial No. 361,602

15 Claims. (Cl. 2—224)

This invention relates to undergarments and has particular reference to men's undergarments, such as drawers.

The main objects of the invention are to provide a snug and smooth-fitting undergarment which will tend to maintain itself in smooth-fitting condition when worn so as to avoid bunching or gathering of the material of the garment in the crotch or at any other place; to provide an arrangement wherein the crotch portion of the garment is supported firmly enough to afford a mild but comfortable body-supporting effect; and to provide a garment of the type referred to equipped with a fly-closed opening in the front.

In general, it is the object of the invention to provide an improved garment of the class described and other objects and advantages of the invention will be understood by reference to the following specification and accompanying drawings (2 sheets) wherein there is illustrated two garments each embodying a selected form of the invention.

In the drawings—

Fig. 1 is a front elevation.

Figs. 2, 3, 4, 5 and 6 are sections, respectively, on lines 2—2, 3—3, 4—4, 5—5 and 6—6 on Fig. 1.

Fig. 7 is a developed view of the blanks of material from which the garment illustrated in Figs. 1 to 6, inclusive, is formed.

Figure 8:
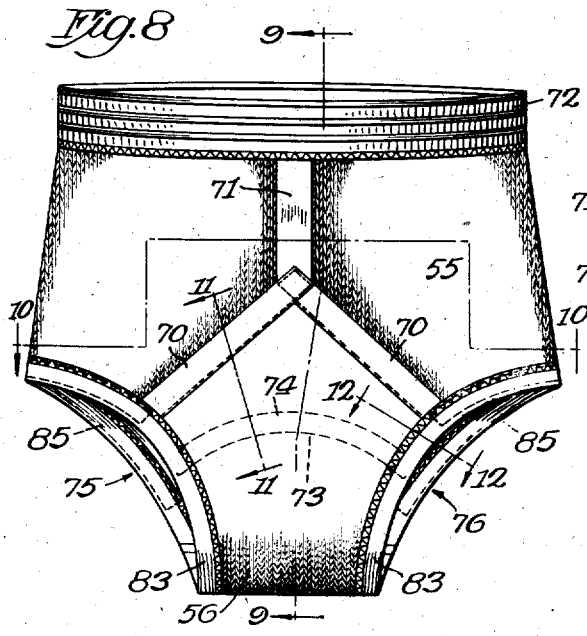
Fig. 8 is a front view corresponding to Fig. 1, but showing another form of the garment.

Figs. 9, 10, 11 and 12 are sections, respectively, on the lines 9—9, 10—10, 11—11, and 12—12 of Fig. 8.

Figure 9:
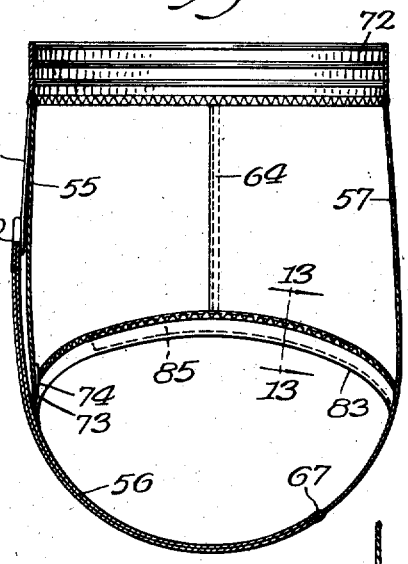
Figure 13:
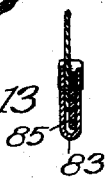

Fig. 13 is a section on the line 13—13 of Figure 9; and

Figure 14:
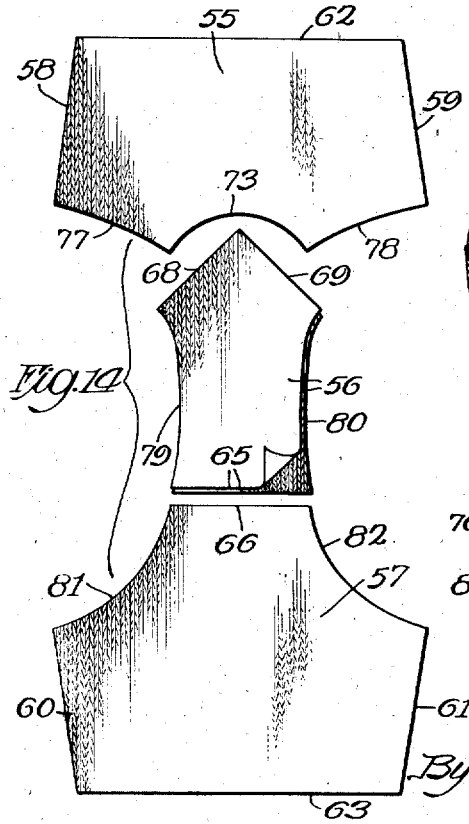
Figure 11:
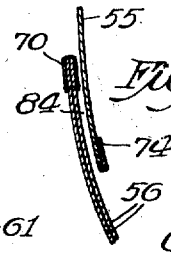
Figure 12:
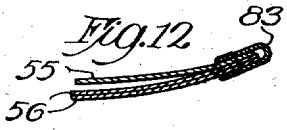

Fig. 14 is a development of the blanks of material from which the garment illustrated in Figs. 8 to 13, inclusive, is formed.

Referring now to the drawings, and more particularly to Figs. 1 to 7, inclusive, the garment shown in said figures comprises front and back body portions 15 and 16, respectively, an elastic waist band 17 and a crotch portion 18.

The front portion 15 of the garment is, in this instance, formed of two sections of material designated 19 and 20, respectively, said portions being suitably stitched together along adjacent edges 21, 21 which form a vertically extending seam located approximately centrally of the front of the body of the garment.

The back portion 16 of the garment is formed, in this instance, from a single section of material and the side edges 22 and 23, respectively, of the front forming sections 19 and 20 are united to the side edges 24 and 25, respectively, of the back section 16. The substantially straight upper edges 26, 27 and 28, respectively, of the front and back-forming sections are disposed approximately in alignment when the parts are united as above explained and a suitable, preferably wide, elastic waist band, such as 17, is united to the said upper edges of the body-forming sections preferably by means of stitching of any well-known type which may be stretched considerably.

The material from which the body sections are formed is preferably knitted material and the wales or ribs thereof preferably extend vertically of the garment so that the body portion is resiliently extensible transversely, but relatively non-stretchable or inelastic vertically.

The crotch-forming portion 18 is also preferably formed of knitted material, the wales of which extend lengthwise of the crotch portion, that is, from front to rear, so that the crotch portion is resiliently stretchable transversely but relatively inextensible longitudinally.

As best indicated in Figs. 2, 6 and 7, the crotch section 18 is formed of two plies of material. The purpose of the two-ply construction is to reinforce the garment in the area of greatest normal stress and to facilitate the provision of the aforementioned mild supporting effect.

The two plies of material forming the crotch portion 18 are substantially identical in contour and they have substantially square cut rear ends 29 and centrally pointed front ends formed by relatively angularly disposed, substantially straight edges 30 and 31.

The square-cut rear edges 29 of the crotch-forming sections are suitably united by stitching to a straight lower end edge of the back-forming section 16, such stitching being indicated at 33 in Fig. 2. Preferably the line of stitching 33 is of a type which is substantially inextensible.

In the form of garment illustrated in Fig. 1, the straight front edge portion 31 of the front end of the crotch piece is united by stitching to an angular, relatively straight edge portion 34 of the front-forming section 20, but the other front edge portion 30 of the crotch piece is not united to the front-forming section 19 except at the central point portion 35 and the outer edge point 36. The front-forming section 19 is provided with an angularly, downwardly extending flap or extension 37 which the pointed front end portion of the crotch piece overlaps as clearly shown in Figs. 1, 2 and 4. The extent of overlapping may be considerably varied, but in one practical form the width of the overlapping portions may be, say, two inches.

Leg openings 38 and 39 are formed when the various sections are united as above explained, the front sections 19 and 20 being formed with arcuate edge portions 40 and 41, respectively, the crotch portion 18 being formed with arcuate side edges 42 and 43, respectively, and the back-forming sections 16 being formed with arcuate edge portions 44 and 45, respectively, which cooperate to form properly shaped leg openings. These openings are preferably so formed that the garment edge portions at said openings will be located or approximately located in or at the groins of the wearer.

To finish off the garment and to provide a supporting effect for the crotch portion, a strip of knitted or other suitable, relatively inextensible, tape-like material designated 46 is secured to the front of the garment overlying the seams formed in joining the edges 21, 21 of the front sections 19 and 20, and the edges 31 and 34 of the crotch section and front section 20, respectively. At the upper end the tape element 46 is secured to the elastic waist band portion of the garment and at its lower end the tape element 46 is suitably connected to the periphery of the garment at the leg opening. A similar relatively longitudinally, inextensible tape strip 47 is secured to the upper marginal portion of the crotch insert extension along its angularly disposed edge 30, said element 47 being connected at its upper end to the inextensible element 46 and at its lower end to the periphery of the garment at the other leg opening.

As indicated in Figs. 2 and 4, the said inextensible element 47 is preferably folded over the upper edge of said crotch edge portion so as to embrace the two plies thereof. In this manner said edge portion which remains free of attachment from the front of the garment is suitably finished. The lower angular edge 37 of the front section 19, which is overlapped by said crotch portion, may also be finished by means of a suitable tape strip 50 which may be folded upon itself so as to embrace the lower marginal portion of the section 19 adjacent said edge 37.

The leg openings may be suitably finished or trimmed, for example, by means of relatively narrow strips such as indicated at 51 of knitted material which is longitudinally extensible and which is doubled upon itself to receive the marginal edge portions at the respective leg openings between the folds of the strip. Elastic elements, such as indicated at 48, 48, are disposed between the folds of the leg opening trimming strips, one end of each of the elastic elements terminating at or adjacent to the front end of the crotch piece at the corresponding side thereof and the other or rear end of the elastic terminating at or near the rear end of the crotch piece at the corresponding side thereof. As clearly indicated in Fig. 1, the elastic elements 48, 48 are located in outer portions only of the respective leg openings and they are anchored in place by suitable stitching such as indicated at 49, 49, which is preferably of an extensible type so as to permit stretching of the respective elastic elements and the portions of the garments adjacent thereto.

As clearly indicated in Figs. 1 and 6, the relatively overlapping portions of the pointed front end extension of the crotch piece 18 and the front-forming section 19 are united together only along their side edges, the union being effected either by directly stitching the parts together or through the agency of the leg opening trimming 51 which embraces the marginal portions at one end of the overlapped sections and by means of stitching which secures the tape strip 46 to the body and which overlies the other end portions of the overlapping sections. Hence, an opening 52 is left between the said overlapping sections, said opening being, in effect, a fly-closed opening.

In effect, the fly-closed opening is formed by an inclined slit in the front part of the garment, and the slit is closed by means of a flap extension from the garment portion on one side of the slit, which extension overlaps the garment portion on the other side of the slit. For example, if the free edge of the element 47 be considered as defining the slit, then the underlying garment portion terminating at the edge indicated at 50 constitutes the extension referred to. The extension is maintained in flat position adjacent the overlying garment portion by means of stitching which extends laterally relative to the slit at the ends of the overlapping portions.

An important benefit derived from the angular or inclined disposition of the slit is a definite, normal tendency for the opening to be maintained closed. This results from the normal distension of the garment both vertically and horizontally around the hips and rump of the wearer, which tends to stretch taut and thereby maintain in contact the relatively overlapping portions of the garment adjacent the slit. The width of the overlapping extension is preferably such that the overlapping relation will normally be maintained notwithstanding a limited amount of distortion of the edges of the garment at the slit or of the extension when under such tension, as may be incident to said distension of the garment when worn.

In the described construction, the elastic waist band 17 is effective to firmly position the garment on the body of the wearer, said elastic being preferably about 1½ inches in width and of a type which has a fairly coarsely gathered surface which will tend to prevent slippage of the waist band over the surface of a shirt or over the body. The inextensible strap elements 46 and 47 provide firm support for the front end of the crotch portion from the waist band, the diverging, angularly disposed portions of the strips 46 and 47 serving, in effect, to distribute the supporting effect of the centrally located, vertical portion of the strap 46 over the entire width of the front end of the crotch portion. The pointed arrangement is also especially desirable in that the angularly disposed supporting strip portions 46 and 47 are then disposed in a position in which they are highly efficient for the indicated supporting purpose.

When the garment is worn and the elastic elements 48, 48 stretched, there is a definite tendency for said elastic elements to stretch the crotch portion both longitudinally and transversely. The stretching force of said elastic elements being applied to the crotch insert at its outer side corners (the widest portions of the crotch piece), the latter will be very effectively held in transversely stretched and smooth condition which contributes materially to the comfort and supporting effect of the garment. The elastics also tend to maintain the inner edge portions of the leg opening snugly adjacent the legs substantially smooth so as to avoid chafing or irritating effects which are incident to gathering or bunching of the crotch portion at or adjacent to the leg opening edges.

The fly-closed opening may be provided on the left side of the vertical center of the garment instead of on the right side as herein illustrated. Such a change would merely involve interchanging of the front-forming sections 19 and 20 and corresponding rearrangement of the inextensible strip elements 46, 47 and 50.

It will be apparent that changes in the detailed construction and shaping of the various sections from which the garment is formed may be made while still producing a garment substantially as above described and so as to obtain the body-conforming and supporting effect indicated.

In one modified form of the invention, the fly-closed opening may be made to extend across the entire front end of the crotch piece. Such an arrangement is shown in Figs. 8 to 14, inclusive. By reference to said Figs. 8 to 14, inclusive, it will be seen that the garment may be constructed from a one-piece front section 55, a two-ply crotch piece 56 and a one-piece back member 57. The side edges 58 and 59 of the front piece are, respectively, stitched to the side edges 60 and 61 of the back member, the straight top edges 62 and 63 of the front and back pieces being disposed in substantial alignment. The seams between the respective side edges are designated 64 in Figs. 9 and 10.

Figure 10:
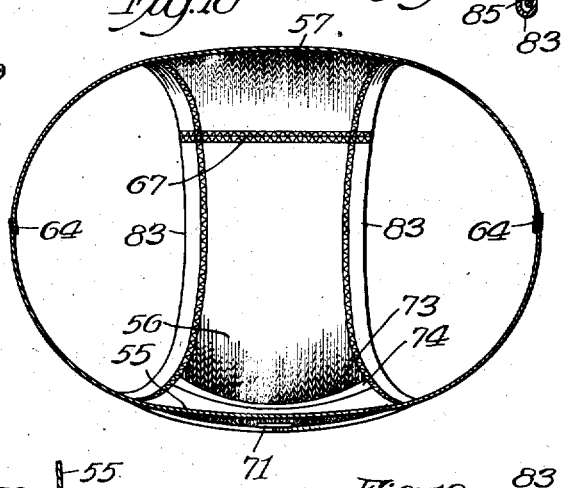

The rear end 65 of the two-ply crotch member 56 is stitched to the lower end 66 of the back member to form a substantially inextensible seam designated 67 in Figs. 9 and 10.

The front end of the two-ply crotch member 56 is extended forwardly and upwardly somewhat and pointed substantially as described in connection with Figs. 1 to 7, inclusive, and the relatively angularly disposed edges 68 and 69 forming the point are preferably enclosed between the folds of a folded tape-like strip 70. The said edges are free of attachment to the front section 55 of the garment which they overlap on the outside, as clearly indicated in Figs. 8 and 9, except that at the points or corners formed by said edges with the opposite slightly arcuate edges of the crotch piece, attachment to adjacent portions of the garment front is provided. The central point is firmly supported or suspended from the waist band of the garment by means of a suitable, relatively inextensible tape strip 71 which is stitched at its lower end to the said pointed portion of the crotch piece and secured at its upper end to the waist band of the garment. The waist band may conveniently consist of elastic webbing 72 as previously explained in connection with Figs. 1 to 7, inclusive.

The pointed upper end portion of the crotch piece overlaps the lower marginal portion of the front section 55 of the garment, the lower edge of which preferably has a centrally arched portion 73 which may be finished in any suitable manner, for example, by means of a strip of elastic webbing 74 stitched to the said edge of the front section by means of a type of stitching which permits stretching of the elastic in conformity with stretching of the material of the garment. As indicated by the lines of shading on the drawings, ther ibs or wales of the material extend vertically of the garment and from front to rear of the crotch piece, and being of knitted material it is accordingly stretchable transversely of the direction of said wales and not materially extensible vertically or from front to rear of the crotch piece.

Leg openings indicated at 75, 76 are formed by suitable arcuate edge portions 77 and 78 of the front piece, 79 and 80 of the crotch piece, and 81 and 82 of the back piece which, when the parts are joined in the manner explained, form continuous openings as illustrated. The leg openings are preferably finished or trimmed by means of narrow or tape-like strips 83 of knitted material which are folded so as to embrace between their folds the marginal portions of the garment around said leg openings.

In the last described form of garment, there is formed, in effect, a fly-closed opening 84 which extends all the way across the front end of the crotch piece.

In both forms of structure the trimming around the leg openings is preferably of such character that it may be stretched to allow enlargement of the leg openings, but it will be observed that because the wales of the crotch-forming portions of the garment extend substantially parallel with the edge portions of the leg openings formed by such crotch member, the inner portions of the leg openings formed by the crotch member will not be materially extensible. The enlargement of the openings is, however, permitted by the portions of the garment forming the outer leg opening portions, and with which portions elastics, such as 48 in Fig. 1 and 85 in Fig. 8, are associated.

The described structure results in a garment of very light weight and which may adequately be supported by means of elastic waist bands as described about the waist of the wearer. The snug fitting arrangement around the leg openings also tends to prevent downward sliding of the garment when worn.

The crotch arrangement is such that the central crotch piece is firmly supported directly from the waist band by means of the described relatively inextensible tape-like elements, and since the crotch piece is resilient or yieldable transversely but relatively inextensible longitudinally, it is adapted to resiliently conform to the body while affording a mild supporter action therefor. The leg opening elastic arrangement effectively pulls the crotch portion of the garment forwardly and rearwardly and also transversely to prevent gathering or bunching of the garment and to improve the supporting effect mentioned. The inelastic stitching connecting the rear end of the crotch piece with the lower end of the back section, serves to limit transverse stretching of the adjacent portions of the garment thereby maintaining the effectiveness of the body-supporting action of the garment.

Changes in the described structure may be made without departing from the spirit of the invention, the scope of which should be determined by reference to the following claims, the same being construed as broadly as possible consistent with the state of the art.

What is claimed is:

1. An undergarment of the class described, comprising body and crotch portions, the body portion having an elastic waist band, the garment also having leg openings, said crotch portion being resilient transversely but relatively inelastic longitudinally of the garment, the front of the garment having relatively overlapping portions forming a fly-closed opening therein, said portions and opening extending downwardly and outwardly at an angle to the normal vertical of the garment, and relatively inextensible means secured at its upper end to said waist band and extending downwardly and secured to the highest portion of the uppermost edge of said overlapping portions, said inextensible means also extending along said uppermost edge towards the lower end of said edge, whereby said uppermost edge of the fly-forming, relatively overlapping portions is supported from the waist band against sagging from normal closed position.

2. An undergarment of the class described, comprising front and back body portions, an elastic waist band, and a crotch portion, said crotch portion having a front end extension lapping a portion of the front of the garment and united thereto at spaced points to form, in effect, a fly-closed opening in the front of the garment, and substantially inelastic means connecting said crotch portion to said waist band to support the crotch portion from the waist band.

3. An undergarment of the class described, comprising front and back body portions, an elastic waist band, and a crotch portion, said crotch portion having a front end extension lapping a portion of the front of the garment and united thereto at spaced points to form, in effect, a fly-closed opening in the front of the garment, and substantially inextensible means connecting the crotch portion with the waist band, said means extending downwardly from the waist band at approximately the vertical center of the front of the garment to the upper edge of said crotch extension and thence outwardly along said upper edge to the side edge of said crotch portion to provide firm support from the waist band for the crotch portion.

4. An undergarment of the class described, comprising front and back body portions, an elastic waist band, and a crotch portion, said crotch portion having a front end extension lapping a portion of the front of the garment and united thereto at spaced points to form, in effect, a fly-closed opening in the front of the garment, and substantially inextensible means connecting the crotch portion with the waist band, said means extending downwardly from the waist band at approximately the vertical center of the front of the garment to the upper edge of said crotch extension and thence outwardly in opposite directions to the respective sides of said crotch portion, said opposite outwardly directed inextensible means being disposed approximately symmetrically on the front of the garment and so located that a portion of said outwardly directed means substantially coincides with the upper edge of said crotch extension, said means serving to afford firm support for the waist band for said crotch portion.

5. An undergarment of the class described, comprising front and back body portions, an elastic waist band, a crotch portion, said crotch portion having a centrally pointed front end extension lapping and secured at spaced points adjacent its front edge to a lower marginal portion of the front of the garment, a portion of said front end extension between said spaced points being free of attachment to said marginal body portion so as to provide, in effect, a fly-closed opening in the front of the garment, relatively inextensible means connecting said waist band with the pointed end of said crotch extension to thereby support said crotch portion from the waist band, and relatively inextensible means extending transversely of said pointed crotch portion along the front edge thereof to thereby distribute the supporting effect of said first-mentioned means across the width of the crotch portion.

6. An undergarment of the class described, comprising front and back portions, an elastic waist band, a crotch portion, said crotch portion having a centrally pointed front end extension lapping and secured at spaced points adjacent its front edge to a lower marginal portion of the front of the garment, a portion of said front end extension between said spaced points being free of attachment to said marginal body portion so as to provide, in effect, a fly-closed opening in the front of the garment, relatively inextensible means connecting said waist band with the pointed end of said crotch extension to thereby support said crotch portion from the waist band, relatively inextensible means extending transversely of said pointed crotch portion along the front edge thereof to thereby distribute the supporting effect of said first-mentioned means across the width of the crotch portion, and means resiliently tending to stretch said crotch portion both longitudinally and transversely when the garment is worn.

7. An undergarment of the class described, comprising front and back body portions, an elastic waist band, a crotch portion, said crotch portion having a centrally pointed front end extension lapping and secured at spaced points adjacent its front edge to a lower marginal portion of the front of the garment, a portion of said front end extension between said spaced points being free of attachment to said marginal body portion so as to provide, in effect, a fly-closed opening in the front of the garment, relatively inextensible means connecting said waist band with the pointed end of said crotch extension to thereby support said crotch portion from the waist band, relatively inextensible means extending transversely of said pointed crotch portion along the front edge thereof to thereby distribute the supporting effect of said first-mentioned means across the width of the crotch portion, and an elastic element on each side of the garment adapted to be stretched when the garment is worn and having its ends terminating adjacent the front and rear ends respectively at the adjacent side of the crotch portion, the arrangement being such that when said elastic elements are stretched the crotch portion is subjected to both longitudinal and transverse stretching.

8. An undergarment of the class described, comprising front and back portions, an elastic waist band, a crotch portion, said crotch portion having a centrally pointed front end extension overlapping the outside of a lower marginal portion of the front of the garment, said pointed front end of the crotch extension being secured adjacent its front edge at one side and at its central point to said front body portion, but being free of attachment to the latter intermediate said points so as to provide, in effect, a fly-closed opening in the front of the garment, relatively inextensible means located centrally of the front of the garment and connecting said waist band with the pointed end of said crotch extension to thereby support said crotch portion from the waist band, and relatively inextensible means extending transversely of said crotch portion along the front edge of said pointed end to thereby distribute the supporting effect of said first-mentioned means across the width of the crotch portion.

9. An undergarment of the class described, comprising front and back portions, an elastic waist band, a crotch portion, said crotch portion having a centrally pointed front end extension overlapping the outside of a lower marginal portion of the front of the garment, said pointed front end of the crotch extension being secured adjacent its front edge at one side and at its central point to said front body portion, but being free of attachment to the latter intermediate said points so as to provide, in effect, a fly-closed opening in the front of the garment, relatively inextensible means located centrally of the front of the garment and connecting said waist band with the pointed end of said crotch extension to thereby support said crotch portion from the waist band, relatively inextensible means extending transversely of said crotch portion along the front edge thereof to thereby distribute the supporting effect of said first-mentioned means across the width of the crotch portion, and an elastic element on each side of the garment adapted to be stretched when the garment is worn, and having its ends terminating adjacent the front and rear ends, respectively, at the adjacent side of the crotch portion, the arrangement being such that when said elastic elements are stretched, the crotch portion is subjected to both longitudinal and transverse stretching force.

10. A man's undergarment or the like provided in its front part with a slit extending at an inclination of about forty-five degrees, downwardly and outwardly from a point below the waistline of the garment toward a front portion of a leg opening, and a flap part for normally closing said slit and constituting an extension of the garment at one side of said slit and overlapping the material of the garment on the other side of said slit, said extension having at one side an edge extending laterally from the slit and secured to the part which it overlaps.

11. A man's undergarment or the like having a main front part provided with a slit extending at an inclination of approximately forty-five degrees, downwardly and outwardly from a point below the waistline of the garment to a point approximately in the groin line in the front of the garment, and a flap part for normally closing said slit and constituting an extension of the garment above said slit and underlying the material of the garment below said slit, said extension having at one side, an edge extending downwardly from the slit and secured to the overlying part.

12. An undergarment of the class described formed of knitted material which is resilient transversely but substantially inelastic vertically and adapted to stretch taut and conform snugly to the body in use, said garment comprising front and back body portions, an elastic waist band, and a crotch portion, said crotch portion having a front end extension lapping a portion of the front of the garment and united thereto at spaced points to form, in effect, a fly-closed opening in the front of the garment, and substantially inelastic means connecting said crotch portion to said waist band to support the crotch portion from the waist band.

13. An undergarment of the class described, formed of knitted material which is resilient transversely but substantially inelastic vertically and adapted to stretch taut and conform snugly to the body in use, said garment comprising front and back portions, an elastic waist band, and a crotch portion, said crotch portion having a front end extension lapping a portion of the front of the garment and united thereto at spaced points to form, in effect, a fly-closed opening in the front of the garment, and substantially inelastic means connecting said crotch portion to said waist band to support the crotch portion from the waist band, said crotch portion being resilient transversely and relatively inextensible longitudinally to provide a mild supporter action.

14. An undergarment of the class described, formed of knitted material which is resilient transversely and substantially inelastic vertically and adapted to stretch taut and conform snugly to the body in use, said garment comprising front and back body portions, an elastic waist band, and a crotch portion, said crotch portion having a front extension lapping a portion of the front of the garment and provided with an edge disposed on an incline and being united to said front portion of the garment at spaced points to form, in effect, a transversely inclined fly-closed opening in the front of the garment, and substantially inelastic means connecting said crotch portion to said waist band to support the crotch portion from the waist band, the knitted material of said garment when stretched in conformity to the body of the wearer serving to exert a tension which tends to close said transversely inclined fly opening.

15. An undergarment of the class described, formed of knitted material which is resilient transversely and substantially inelastic vertically and adapted to stretch taut and conform snugly to the body in use, said garment comprising front and back body portions, an elastic waist band, and a crotch portion, said crotch portion having a front extension lapping a portion of the front of the garment and provided with an edge disposed on an incline and being united to said front portion of the garment at spaced points to form, in effect, a transversely inclined fly-closed opening in the front of the garment, and substantially inelastic means connecting said crotch portion to said waist band to support the crotch portion from the waist band, said crotch portion being resilient transversely and relatively inextensible longitudinally to provide a mild supporter action, the knitted material of said garment when stretched in conformity to the body of the wearer serving to exert a tension which tends to close said transversely inclined fly opening.

ARTHUR R. KNEIBLER.

CERTIFICATE OF CORRECTION.

Reissue No. 21,999. January 6, 1942.

ARTHUR R. KNEIBLER.

It is hereby certified that the name of the assignee in the above numbered patent was erroneously described and specified as "Coopers Inc." whereas said name should have been described and specified as --Cooper's, Incorporated--; as shown by the record of assignments in this office; and that the said Letters Patent should be read with this correction therein that the same may conform to the record of the case in the Patent Office.

Signed and sealed this 17th day of March, A. D. 1942.

Henry Van Arsdale,
Acting Commissioner of Patents.

(Seal)